US 7,441,107 B2

(12) United States Patent
Hammond et al.

(10) Patent No.: US 7,441,107 B2
(45) Date of Patent: Oct. 21, 2008

(54) UTILIZING AN ADVANCED LOAD ADDRESS TABLE FOR MEMORY DISAMBIGUATION IN AN OUT OF ORDER PROCESSOR

(75) Inventors: Gary N. Hammond, Fort Collins, CO (US); Carl C. Scafidi, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/750,150

(22) Filed: Dec. 31, 2003

(65) Prior Publication Data

US 2005/0149703 A1 Jul. 7, 2005

(51) Int. Cl.
*G06F 9/00* (2006.01)
(52) U.S. Cl. ...................... 712/225; 712/216
(58) Field of Classification Search ................. 712/225, 712/216
See application file for complete search history.

(56) References Cited

U.S. PATENT DOCUMENTS 6,598,156 B1* 7/2003 Arora .......................... 712/244
6,658,559 B1* 12/2003 Arora et al. ................. 712/245
6,889,315 B2* 5/2005 Miyake et al. ............... 712/217
2004/0168045 A1* 8/2004 Morris et al. ................ 712/225

OTHER PUBLICATIONS

"Itanium 2 Processor Microarchitecture"; Cameron McNairy and Don Soltis; IEEE; Mar. 2003.*
"ARB: A Hardware Mechanism for Dynamic Reordering of Memory References"; Manoj Franklin and Gurindar Sohi; IEEE; 1996.*
"Computer Architecture: A Quantitative Approach" John Hennessy and David Patterson; May 2002.*
"Superscalar Microprocessor Design"; Mike Johnson; 1991.*
Gharachorloo et al.; "Two Techniques to Enhance the Performance of Memory Consistency Models"; 1991; Proceedings of the 1991 International Conference on Parallel Processing.*
Huck et al.; "Introducing the IA-64 Architecture"; 2000; IEEE.*
Yoaz et al.; "Speculation Techniques for Improving Load Related Instruction Scheduling"; 1999; IEEE, ?*

* cited by examiner

*Primary Examiner*—Tonia L. M. Dollinger
*Assistant Examiner*—Benjamin Geib
(74) *Attorney, Agent, or Firm*—Blakely, Sokoloff, Taylor & Zafman LLP

(57) ABSTRACT

Embodiments include a system for minimizing storage space required for tracking load instructions through a pipeline in a processor. Store instructions are tracked in a separate queue and only load instructions that require speculation on data or addresses are tracked in a load table and flagged in the reorder buffer. This system improves system performance by reducing energy and space requirements.

21 Claims, 5 Drawing Sheets

UTILIZING AN ADVANCED LOAD ADDRESS TABLE FOR MEMORY DISAMBIGUATION IN AN OUT OF ORDER PROCESSOR

BACKGROUND

1. Field of the Invention

The embodiments of the invention relate to memory and pipeline management. Specifically, the embodiments of the invention relate to maintaining memory coherence in an out of order processor pipeline.

2. Background

Processors in a computer utilize a pipeline and multiple execution units to process instructions out of order to improve system performance. Processing instructions out of order allows a processor to execute more instructions in a given time period because the processor is able to process multiple instructions simultaneously and to execute instructions that are ready to be processed immediately while other instructions are stalled. Instructions may be stalled because they require data to be retrieved from a memory device, storage device or input device.

Compilers may be programmed to facilitate out of order processing. Compilers may group or order instructions out of original program order based on static information known at compile time. One technique a compiler may use is to advance a load instruction from its original program order position. Load instructions often entail delay in processing because they may require a retrieval of data from memory. Retrieving data from memory is significantly slower than the execution of an instruction that does not require a memory access. Advancing the placement of loads increases the chances that the load will complete its memory access before the loaded data is needed by subsequent instructions allowing for their immediate execution as they occur in program order.

Hardware structures in a pipeline may perform similar optimization procedures based upon dynamic information known to the processor at run time. The pipeline architecture may detect an upcoming load and advance its processing or pre-fetch the needed data in memory.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
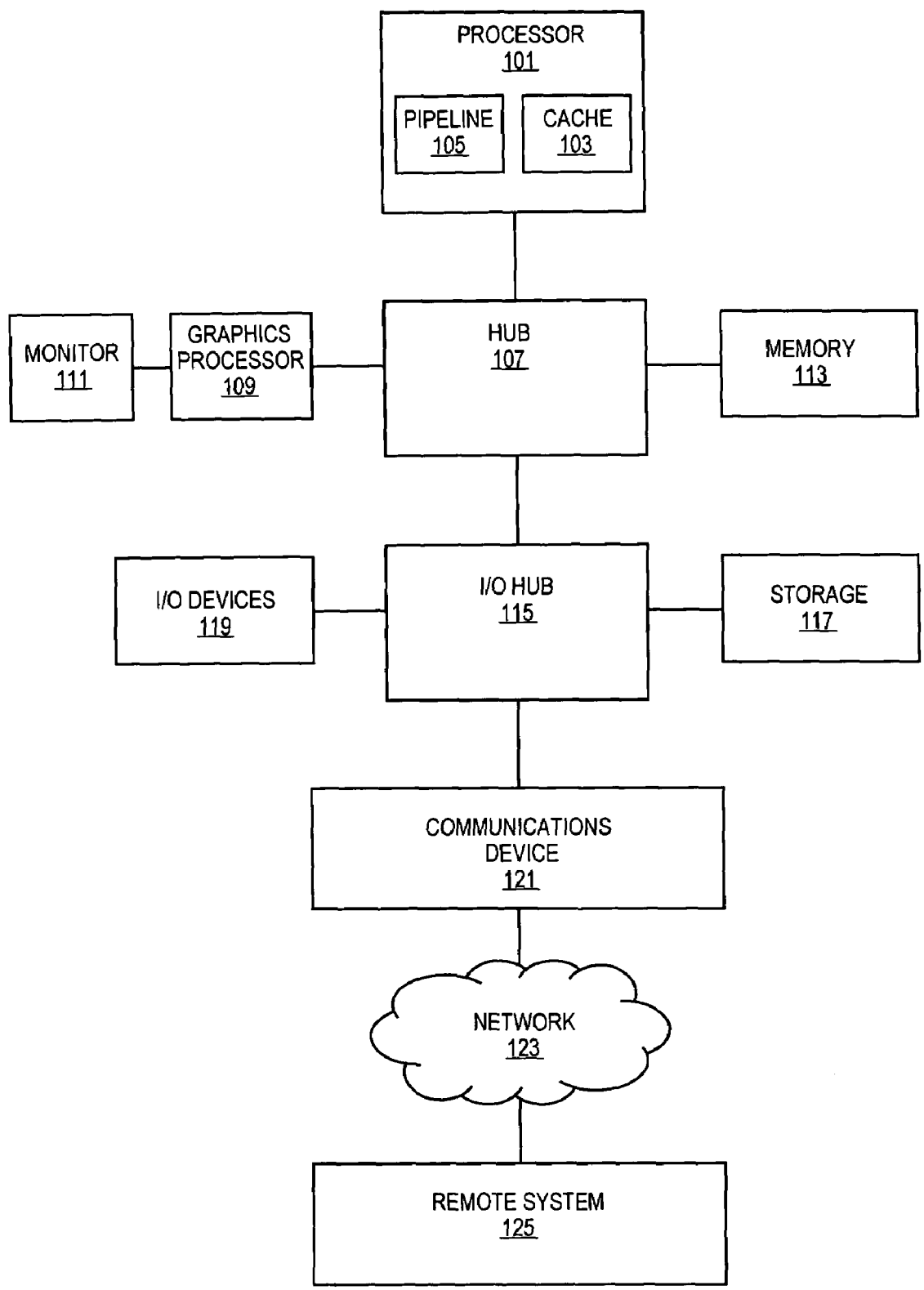
FIG. 1 is a block diagram of one embodiment of a computer system.

FIG. 1 is a block diagram of one embodiment of a computer system. In one embodiment, processor 101 may include a pipeline for processing instructions out of order and a cache 103 for storing data and instructions retrieved from memory 113 or similar sources. The computer system may include multiple processors each having their own caches and pipelines for processing instructions. The caches may coordinate the sharing of data from memory 113 and other system devices.

In one embodiment, processor 101 may be in communication with a hub 107. Hub 107 may facilitate communication between processor 101, memory 113, graphics processor 109 and similar input and output devices. In one embodiment, hub 107 is a component or chipset on a mainboard or similar platform. Hub 107 may be a "Northbridge" chipset. In one embodiment, graphics processor 109 may be a component or chipset on a mainboard or similar platform. In another embodiment, the graphics processor 109 may be on a peripheral card connected to the mainboard or platform via an accelerated graphics port (AGP) or similar connection. Graphics processor 109 may be in communication with a monitor 111 or display device. A display device may be a cathode ray tube (CRT) device, liquid crystal display device, plasma display device or similar display device.

In one embodiment, hub 107 may be in communication with input output (I/O) hub 115. I/O hub 115 may facilitate communication between hub 107 and I/O devices 119, storage devices 117 and similar devices. In one embodiment, I/O hub 115 may be a component or chipset on a mainboard or similar platform. I/O hub 115 may be a "Southbridge" chipset. I/O hub 115 may be in communication with a communications device 121. Communications device 121 may be a network card, wireless device or similar communication device.

In one embodiment, the computer system may be connected to a network 123 through communications device 121. The computer system may communicate through network 123 with a remote system 125 such as a computer system, console device, handheld device, sensor or similar system.

Figure 2:
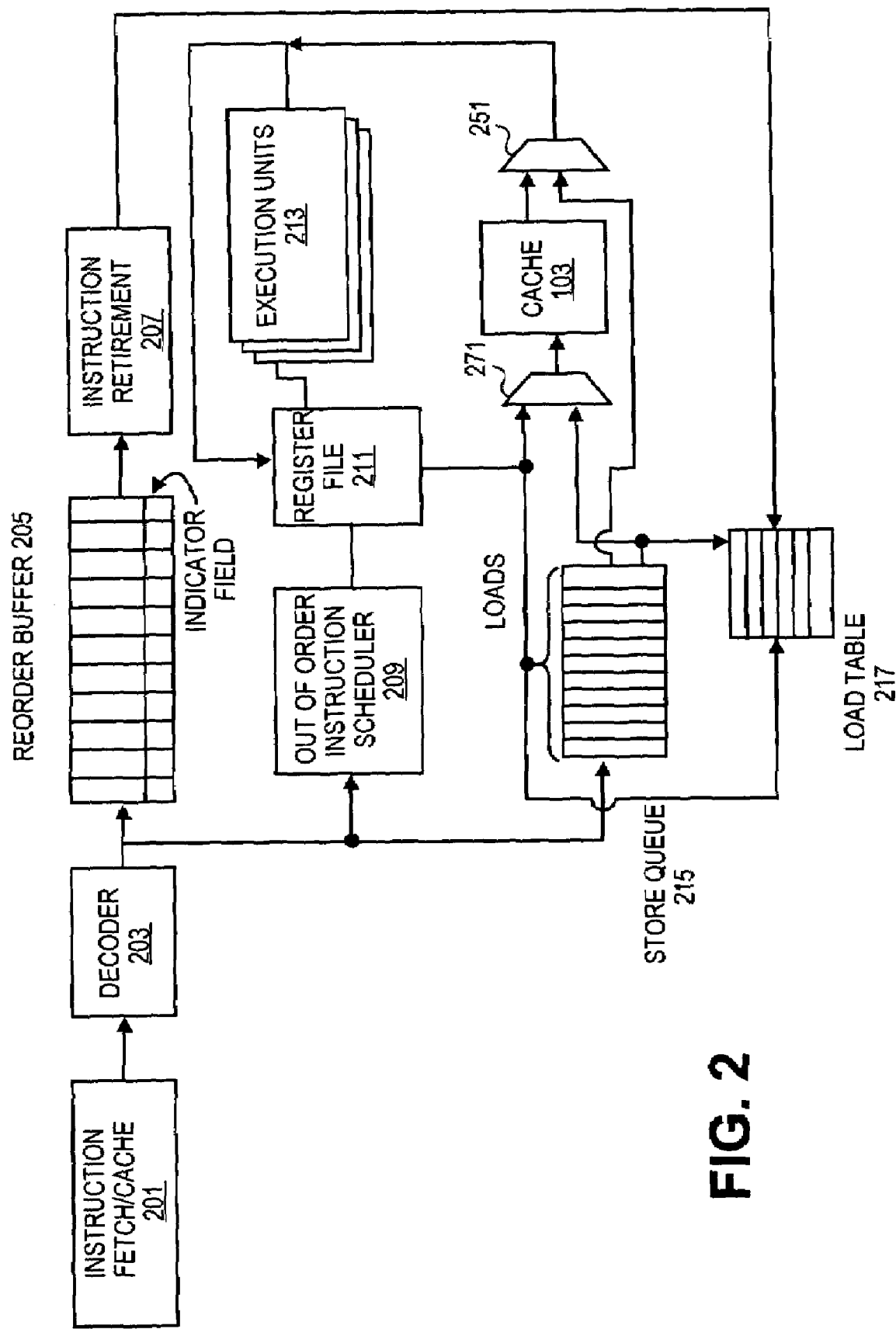
FIG. 2 is a block diagram of one embodiment of pipeline architecture in a processor.

FIG. 2 is a diagram of one embodiment of a pipeline architecture in a computer system. In one embodiment, the architecture is a 32 bit, 64 bit or greater bit architecture. In one embodiment, the pipeline may include an instruction fetch and cache component 201 that may initiate the retrieval of instructions to be executed by a processor. The instruction fetch component 201 may provide the retrieved instruction or set of instructions to a decoder component 203. A decoder component may translate or decode the fetched instruction in preparation for the execution of the instruction by an execution unit 213.

In one embodiment, the fetched and decoded instruction may then be queued into a reorder buffer 205 and instruction scheduler 209. If the instruction is a store instruction then the instruction may also be queued into a store queue 215. A reorder buffer 205 may be a queue or data structure for tracking all the fetched instructions in program order until each instruction is ready to be retired. In one embodiment, reorder buffer 205 may include an indicator field for each entry that tracks whether an entry that is a load instruction or load check instruction is to be checked against the contents of load table 217 before retirement.

In one embodiment, out of order instruction scheduler 209 assigns instructions for execution to execution units 213. Out or order instruction scheduler 209 may analyze a set of instructions to optimize the order in which the instructions are assigned and determine the resources needed to execute the instruction. For example, the computer system may include different types of execution units such as floating point units and similar specialized processing units. Instructions requiring these resources may be assigned to the appropriate execution unit. Instructions requiring resources or data that are not available may be withheld from issuance to an execution unit 213 until such time as the resources or data are ready.

In one embodiment, register file 211 is a set of registers for use in executing instructions and for storing data. Instructions may write to and read from registers in register file 211. Registers in register file 211 may be shared by execution units 213. Execution units 213 are a set of processing devices capable of executing instructions of the computer system and manipulating computer system resources as directed by the instructions.

In one embodiment, the pipeline architecture may be in communication with a cache 103. Cache 103 may store data including instructions retrieved from system memory 113. Cache 103 may be a local storage device for frequently used data to minimize delays caused by accessing system memory 113 and storage device 117.

In one embodiment, the pipeline architecture may include a store queue 215. Store queue 215 may track store instructions in relative program order. Store instructions may be tracked in program order to ensure memory coherence by updating cache 103 in the order intended by the program being executed. In one embodiment, store queue 215 may operate in a first in first out (FIFO) method. In another embodiment, store queue 215 may be any data structure capable of tracking the relative order of its contents. In a further embodiment, allotment of entries in store queue 215 may be on a demand driven basis. After retirement of a store instruction, the store instruction may be removed from store queue 215 and placed into cache 103. If multiple store instructions are retired, cache 103 may be updated with the store instruction data in any order provided the set of store instructions to be retired does not include multiple updates to the same memory address. Multiple updates to the same memory address may be carried out in relative program order.

In one embodiment, the pipeline architecture may include a load table 217. Load instructions may be allocated into load table 217 out of order on a demand driven basis as load instructions are designated for execution to execution units 213 and an unknown earlier store instruction is detected in store queue 217. Load table 217 may track a subset of 'in flight' load instructions. 'In flight' load instructions may refer to load instructions that have been fetched and sent to the out of order instruction scheduler 209 or execution units 213 but have not been retired. Load table 217 may track only load instructions that utilize data that was speculative such as an operand or an address. In one embodiment, load table 217 tracks advanced loads that utilize speculative data. An advanced load is a load instruction that may have been moved forward in program order from its original position by a compiler or hardware. The advanced load instruction may have a corresponding load check or check instruction that determines if the speculation was correct before retiring the load instruction. In one embodiment, load table 217 may be an advanced load allocation table (ALAT).

In one embodiment, the pipeline architecture may include an instruction retirement component 207. Instruction retirement component 207 may commit the results of executed instructions to the system architecture in program order. In one embodiment, instruction retirement component 207 may be connected to load table 217 to check load instructions marked in reorder buffer 205 to determine if the speculation related to the instruction was accurate. In another embodiment, instruction retirement component 207 may check for a load instruction being retired if a conflict between the load instruction and a earlier store instruction had been detected.

In one embodiment, data flow between store queue 215, out of order instruction scheduler 209 and cache 103 may be manipulated by multiplexor 271 or similar data flow circuitry. Multiplexor 271 may allow pipeline architecture to update cache 103 with store instruction data from store queue 215 when store instructions are retired. In one embodiment, data flow between store queue 215 and the results bus may be manipulated by multiplexor 251 or similar data flow circuitry. Multiplexor 251 may allow either data from cache 103 or store queue 215 to be supplied when a load instruction retrieves its target data.

Figure 3:
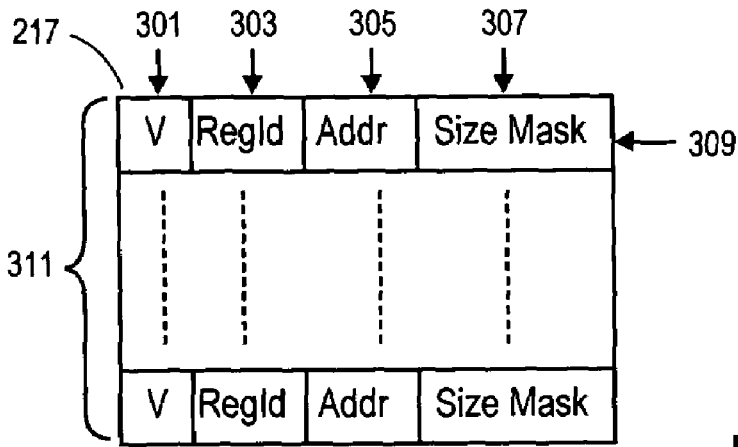
FIG. 3 is a diagram of one embodiment of a load table.

FIG. 3 is a block diagram of one embodiment of a load table. In one embodiment, load table 217 includes a set of entries 311 to track in flight load instructions. A single entry 309 may track basic characteristics of the load operation. Entry 309 may track whether the entry is valid 301. Entry 309 may track a target register identification 303 of the load instruction. For example, a register identification 303 may be the destination register into which the loaded data will be stored. Entry 309 may track an address 305 or portion of an address of the location of the data to be loaded. In one embodiment, entry 309 may track the size 307 of the data to be loaded. For example, load instructions may have varying sizes including 2 byte, 4 byte, 8 byte and similar sized loads of data. Load instructions may have any size supported by the computer architecture.

Figure 4:
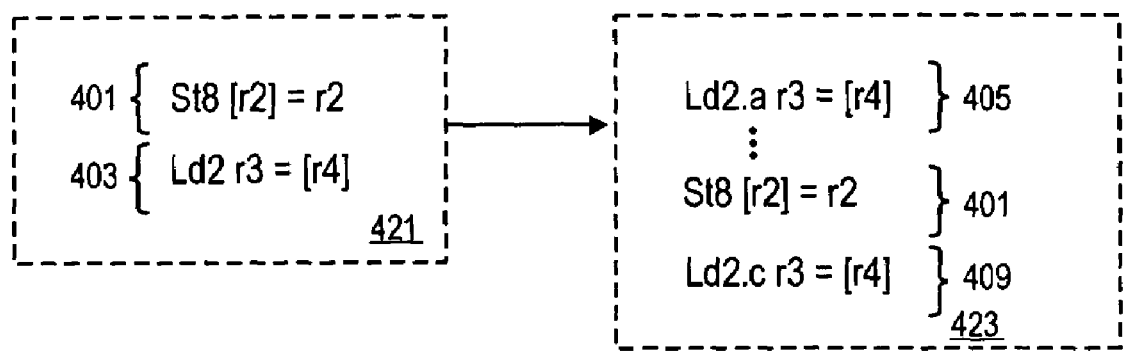
FIG. 4 is an illustration of one embodiment of a compiler process.

FIG. 4 is a diagram of one embodiment of the conversion of a load instruction into an advanced load instruction. An exemplary initial instruction set 421 includes a store instruction 401 and a load instruction 403. Store instruction 401 is an eight byte store instruction that stores 8 bytes of data into a memory address in register 1 using eight bytes of data stored in register 2. Load instruction 403 loads two bytes of data into register 3 from the memory address stored in register 4. A compiler may reorder the execution of these instructions to advance the position of load instruction 403 to an earlier program order position that improves system performance. Instruction set 423 is a conversion of instruction set 421 that may advance load 403 and convert the instruction into an advanced load instruction 405 and load check instruction 409. Advanced load instruction 405 is a two byte load instruction that may be identical in operation to load instruction 403. Store instruction 401 may remain the same in the converted code. Load instruction 403 at its original program order position may be converted to a check load instruction 409 that may determine if the advanced load has caused a conflict or error. In one embodiment, advanced load instruction 405 may be moved forward in program order resulting in any number of instructions being between advanced load instruction 405 and store instruction 401 and load check instruction 409.

Figure 5:
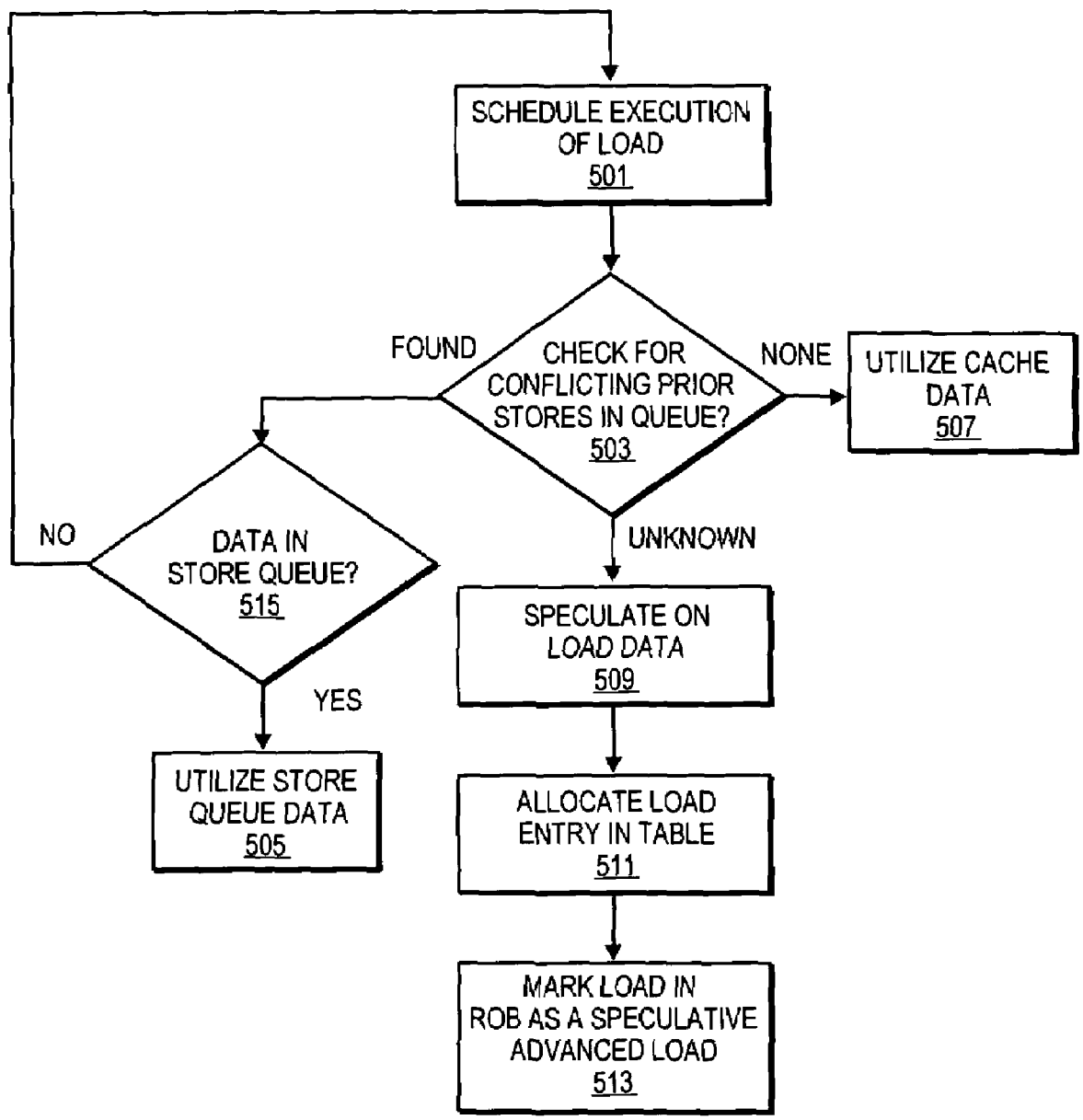
FIG. 5 is a flowchart of one embodiment a process for performing a load instruction allocation into a load table.

FIG. 5 is a flowchart of one embodiment of the process for handling a load instruction in the pipeline architecture. In one embodiment, after a set of instructions are retrieved by the pipeline architecture, each instruction may be stored in the reorder buffer 205 and sent to the out of order instruction scheduler 209. Out of order instruction scheduler 209 may assign each instruction including load instructions to an execution unit 213 to be processed (block 501). In one embodiment, at the time out of order instruction scheduler 209 issues a load instruction to an execution unit 213, a search may be made of store queue 215 to determine if earlier stores with conflicting addresses are present (block 503). In one embodiment, the detection of conflicting entries may utilize well known conflict detection algorithms. In one embodiment, the search of store queue 215 may be fully associative and based on a comparison of memory addresses to be loaded with memory addresses to be stored. The comparison may include the size of each store and load instruction to detect any overlap in the modification or reading of memory to ensure coherency. In one embodiment, the search may be for store instructions that occur in program order before the load.

In one embodiment, if a conflict is found then a check may be made to determine if the store queue 217 entry with the conflicting address has the corresponding data ready for use (block 515). If the data is not ready for use then the issuing of the load instruction may be delayed until the data is available or sent to be rescheduled for a later time (block 501). If the data required by the load instruction is present in the store queue 215 then this data may be used and stored in the appropriate register through multiplexor 251 (block 505). A part of or the whole of the data required by the load instruction may be present in the store queue entry 217 for use. If no overlap is found in store queue 215 then the data required by the load instruction may be retrieved from cache 103. The data may be output from cache 103 through multiplexor 251.

In one embodiment, if it is not known if there may be a conflict then the pipeline architecture may speculate on the possible conflict (block 509). For example, some entries for store instructions in store queue 215 may not have resolved either the data to be stored or the address at which the data is to be stored because the instructions are dependent on prior instructions which have not completed. The decision to speculate may be determined by any known prediction algorithm used for this purpose.

In one embodiment, an entry may be made in load table 217 for the speculative load instruction (block 511). Any known replacement algorithm may be used to manage replacement and selection of space for a new entry in load table 217. The new entry may be marked as valid. The entry may contain destination register information, load size, and the associated memory address. In one embodiment, when an entry is allocated in load table 217 an indicator may also be marked in reorder buffer 205 in the entry corresponding to the load instruction and/or the entry or the corresponding load check instruction. This indicator may be a flag to check the resolution of the speculative data before retirement of the load instruction or load check instruction. This flag may also serve as an indication that the load instruction is a speculative advanced load.

Figure 6:
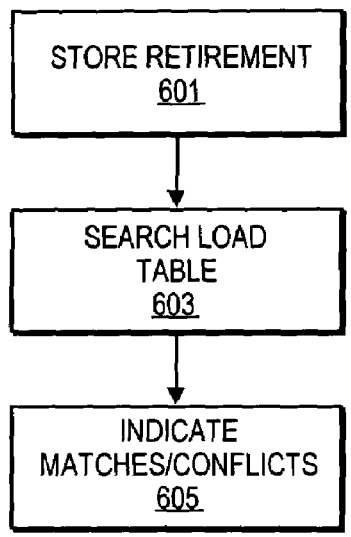
FIG. 6 is a flowchart of one embodiment of a process for performing a store instruction retirement.

FIG. 6 is a flowchart of one embodiment of a process for processing a store instruction by the retirement component in the pipeline architecture. Store instructions are decoded, stored in the reorder buffer and store queue and sent to the out of order scheduler for execution. When the store instruction is executed and reaches the head end of the reorder buffer 205 it is ready for retirement (block 601). In one embodiment, retirement component 207 may search load table 217 to find load entries that conflict with the store instruction to be retired (block 603). A conflicting entry may be an entry for a load instruction that occurs in program order after the store instruction and has an overlapping memory access. In one embodiment, if a conflicting entry is found then the entry may be invalidated (block 605). This prevents the retirement of the corresponding load instruction because it may have utilized inaccurate data.

Figure 7:
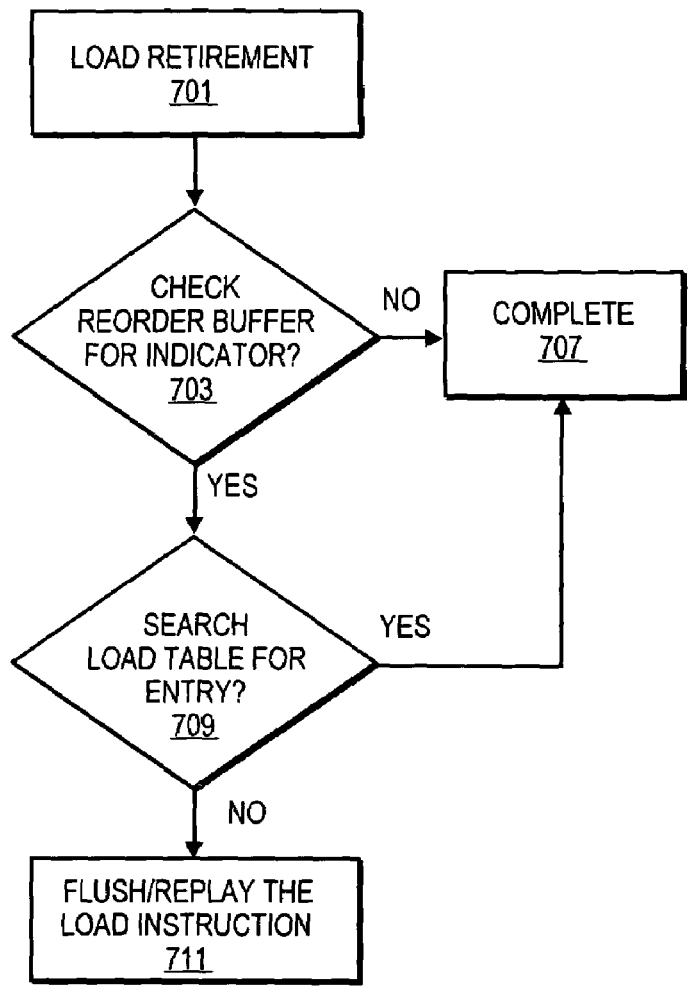
FIG. 7 is a flowchart of one embodiment of a process for performing a load instruction retirement.

FIG. 7 is a flowchart of one embodiment of a process for performing the retirement of a load instruction by the retirement component. In one embodiment, a load instruction or load check instruction may be prepared to be retired after it has reached the end of reorder buffer 205 by being the oldest instruction according to program order remaining in reorder buffer 205 (block 701). A check may be made of reorder buffer 205 to determine if the indicator field is set (block 703). If the field is not set then the load instruction may be retired (block 707). If the field is set then a search of load table 217 may be made (block 709). If an entry corresponding to the load instruction to be retired is found then the retirement may be completed (block 707). The existence of the entry indicates the speculation was accurate and no corrective action may be needed. If a corresponding entry is not found, then the pipeline architecture may be flushed or the load instruction may be replayed (block 711).

In one embodiment, the system may utilize two basic classes of load instructions. Normal load instructions and advanced load instructions. Advanced load instructions may be generated by a compiler or by the architecture of the pipeline. Normal load instructions may occur in their intended program order and therefore may not be tracked in load table 217 because they do not rely on speculative data. Both types of advanced load instructions may rely on speculative data and be allocated into load table 217. Load table 217 may include a field to indicate whether an advanced load is a compiler or architecture hardware generated advanced load. Check and check load instructions generated by a compiler do not anticipate architecture advanced loads. When load table 217 is checked at load instruction or load check retirement only compiler load entries may be searched for a matching entry in order to preserve memory coherence.

The system provides a power efficient architecture with a reduced space requirements. The system may not utilize a memory order buffer (MOB) that tracks all load and store instructions. The small load table reduces the space required by the pipeline architecture. The system may track less than half as many load instructions as a pipeline architecture utilizing a MOB. The system may only track load instructions that have potential conflicts with earlier store instructions in contrast to tracking all load instructions. Further, the system does not require stalling or throttling of the pipeline due to overflow of an MOB. Load table 217 may drop any entry if it overflows. This may result in a flush and replay of the dropped load instructions but does not require a stall or throttling of the pipeline. In one embodiment, during entry replacement selection for load table 217, architectural advanced loads are dropped before compiler advanced loads because they may be recovered without a flush and replay of instructions. This system provides a simplified architecture for handling overflow that also reduces power and space requirements commensurate with the scale of the architecture.

The system may be implemented in software, for example, in a simulator, emulator, or similar software. A software implementation may include a microcode implementation. A software implementation may be stored on a machine readable medium. A "machine readable" medium may include any medium that can store or transfer information. Examples of a machine readable medium include a machine readable storage medium (e.g. a ROM, a floppy diskette, a CD-ROM, an optical disk, a hard disk), a machine readable transmission medium (e.g. radio frequency (RF) link), and similar media and mediums.

In the foregoing specification, the invention has been described with reference to specific embodiments thereof. It will, however, be evident that various modifications and changes can be made thereto without departing from the broader spirit and scope of the embodiments of the invention as set forth in the appended claims. The specification and drawings are, accordingly, to be regarded in an illustrative rather than a restrictive sense.

What is claimed is:

1. A method comprising:

allocating issued store instructions within a store queue in program order;

allocating an entry for an issued load instruction in a structure for tracking only load instructions advanced by software, if the issued load instruction utilizes speculative data; and flagging a field in a reorder buffer to indicate that the speculative load instruction that uses data is to be checked at retirement by a search of the structure to determine whether one of the in program order store instructions allocated within the store queue invalidates the load instruction.

2. The method of claim 1, further comprising:
searching the structure to confirm the load data when the load instruction retires.

3. The method of claim 1, further comprising:
invalidating the entry for the load instruction during a store instruction retirement if the store instruction conflicts with the load instruction.

4. The method of claim 2, further comprising:
flushing a pipeline if the structure for tracking only load instructions does not contain a valid entry for the load instruction at load instruction retirement.

5. The method of claim 1, wherein the load instruction is an advanced load instruction.

6. The method of claim 5, further comprising:
converting a basic load instruction into an advanced load instruction.

7. The method of claim 1, wherein the structure for tracking load instructions is an advanced load allocation table.

8. A device comprising:
a hardware store queue track only store instructions that allocates issued store instructions in program order;
a load structure coupled to the store queue to track only speculative load instructions and load instructions advanced by software; and
a reorder buffer to track program order of instructions, the reorder buffer including an entry to track program order of a load instruction, the entry including a field indicating the load instruction is to be checked at retirement by a search of the load structure to determine whether one of the in program order store instructions allocated within the store queue invalidates the load instruction.

9. The device of claim 8, further comprising:
an instruction scheduler coupled to the store queue to schedule instruction execution.

10. The device of claim 8, wherein the load queue is an advanced load allocation table.

11. A system comprising:
a first hardware processor having at least a 64 bit architecture comprising a first data cache, a set of execution units, a scheduler coupled to the data cache and the set of execution units, a store queue coupled to the instruction scheduler to allocate issued store instructions in program order, a load structure coupled to the store queue to track only speculative load instructions and in program order load instructions advanced by software, a reorder buffer to track program order of instructions, the reorder buffer including an entry to track the program order of a load instruction, the entry including a field indicating the load instruction is to be checked at retirement by a search of the load structure to determine whether one of the in program order store instructions allocated within the store queue invalidates the load instruction;
a bus coupled to the processor; and
a system memory device coupled to the bus.

12. The system of claim 11 further comprising:
a second processor coupled to the bus comprising a second data cache.

13. An apparatus comprising:
hardware means for tracking only speculative load instructions and load instructions advanced by software; and
means for tracking all instructions in program order coupled to the means for tracking only speculative load instructions and load instructions advanced by software, comprising a field to indicate a load instruction is to be checked at retirement by determining whether an in program order store instruction invalidates a speculative load instruction, the field in an entry tracking program order of the load instruction.

14. The apparatus of claim 13, further comprising:
means for tracking only store instructions coupled to means for tracking only speculative load instructions.

15. The apparatus of claim 13, further comprising:
means for flushing a pipeline upon detection that a speculative load is not present in the means for tracking only speculative loads at the time of load instruction retirement.

16. A machine readable storage medium having instructions encoded therein which when executed cause a machine to perform a set of operations comprising:
tracking only a set of load instructions relying on speculative data and load instructions advanced by software in a first data structure of a processor; and
tracking a set of instructions in program order in a second data structure having a field to indicate to check speculation in a load instruction at a time of load instruction retirement by determining whether an in program order store instruction invalidates a speculative load instruction, the field in an entry tracking program order of the load instruction.

17. The machine readable storage medium of claim 16, having instructions encoded therein which when executed causes a machine to perform a set of operations further comprising:
tracking only a set of store instructions in a store queue of the out of order processor.

18. The machine readable storage medium of claim 16, having instructions encoded therein which when executed cause a machine to perform a set of operations further comprising:
invalidating allocated load instruction entries during store instruction retirement.

19. The machine readable storage medium of claim 16, wherein the first data structure is an advanced load allocation table.

20. The machine readable storage medium of claim 16, wherein the second data structure is a reorder buffer.

21. A method comprising:
allocating a first entry for a load instruction in a reorder buffer, the first entry to track program order of the load instruction;
allocating issued store instructions within a store queue in program order;
determining that it is unknown whether a memory address associated with a store instruction from the store queue that is prior, in program order, to the load instruction conflicts with a memory address associated with the load instruction;
utilizing speculative data in an execution of the load instruction, if it is determined that it is unknown whether the memory address associated with the store instruction conflicts with the memory address associated with the load instruction;
allocating a second entry for the load instruction in a load table, the load table being a structure for tracking only load instructions advanced by software, the second entry including characteristics of an operation of the load instruction; and flagging a field in the first entry in the reorder buffer, the field to indicate that the load instruction is to be checked in relation to the load table, to confirm accuracy of the data used in the execution of the load instruction, at retirement of the load instruction by a search of the structure to determine whether one of the in program order store instructions allocated within the store queue invalidates the load instruction.

* * * * *